July 9, 1963  R. P. CHASMAR ET AL  3,097,296
DEVICE FOR MULTIPLYING ELECTRICAL QUANTITIES
Filed June 4, 1959  3 Sheets-Sheet 2

INVENTORS
REGINALD PHILIP CHASMAR
EMANUEL COHEN

ATTORNEY

July 9, 1963  R. P. CHASMAR ET AL  3,097,296
DEVICE FOR MULTIPLYING ELECTRICAL QUANTITIES
Filed June 4, 1959  3 Sheets-Sheet 3

INVENTORS
REGINALD PHILIP CHASMAR
EMANUEL COHEN
ATTORNEY

3,097,296
DEVICE FOR MULTIPLYING ELECTRICAL QUANTITIES

Reginald Philip Chasmar, Timperley, and Emanuel Cohen, Prestwich, Manchester, England, assignors to Associated Electrical Industries (Manchester) Limited, a British company
Filed June 4, 1959, Ser. No. 818,225
Claims priority, application Great Britain June 6, 1958
5 Claims. (Cl. 235—194)

This invention relates to devices for multiplying electrical quantities. It provides a multiplying device which utilises the Hall effect.

If an electrical current is passed between opposite ends of a semi-conductor plate and a magnetic field is applied across the faces of the plate, then a voltage will appear across the remaining sides of the plate. This voltage is proportional to the product of the magnetic field and the current flowing and inversely proportional to the thickness of the plate. This effect is known as the Hall effect. Suitable semi-conductor materials for a Hall plate are germanium silicon and intermetallic compounds of Group III and Group V, such as indium arsenide.

According to the present invention a device for multiplying electrical quantities comprises a ferrite member, a coil positioned in juxtaposition to the ferrite member so that current in the coil produces a corresponding magnetic flux in the member, and a semi-conductor plate positioned between faces in the member defining a gap so that the opposite faces of the plate contact the faces of the member and the magnetic flux passes across the plate, which plate has a pair of current input connections and a pair of output connections, the arrangement being such that the voltage between said output connections is proportional to the product of the current in the coil and current flowing between said input connections.

The ferrite member may comprise a central ferrite core having ferrite end plates and an annular ferrite cylinder surrounding the core and extending between the end plates. The coil is then positioned in the annular space between the central core and surrounding cylinder.

The semi-conductor plate can be included in the magnetic circuit of the ferrite member in a number of ways. One way is to cement the semi-conductor plate to one of the ferrite end plates centrally thereof so that the semi-conductor plate lies between this plate and the end of the ferrite core. In another arrangement the ferrite core can be split into two sections along a plane perpendicular to its axis and the semi-conductor plate can be positioned between these two sections. In yet another arrangement a plurality of semi-conductor plates are secured to one of the ferrite end plates adjacent the periphery thereof so that they contact the annular ferrite cylinder.

Conveniently, the device can be constructed as a single unit enclosed in an envelope, with the external connections taken to the pins of a valve-type base.

Owing to the finite area of the loops formed by the current supply connections and Hall output connections unwanted voltages may be introduced into these circuits by direct induction from the field of the main coil. In order to eliminate these voltages a compensating coil may be connected in series with the current input connections. In addition a further compensating coil may be connected in series with the signal output connections. These compensating coils are centre tapped, and the ends of the coils connected together through a potentiometer wire. Adjustment of the position of sliding connections on the potentiometer wires will annul the unwanted pick-up voltages. In a preferred embodiment one or both of these compensation coils and potentiometers can be included as integral parts of the device.

Such devices have a number of applications as voltage and current multipliers, frequency changers, mixers and modulating devices. Either or both of the inputs may be fed with A.C. or D.C. Typical uses of a device are in servo-mechanisms, analogue computers or D.C. to A.C. choppers.

In order that the invention may be more fully understood reference will now be made to the accompanying drawings, in which:

FIG. 1 shows a circuit diagram explaining the Hall effect;

FIGS. 2a and 2b show respectively in sectional elevation and plan an embodiment of the invention;

FIG. 3 shows an alternative embodiment of the invention in section;

FIGS. 4a and 4b show yet another embodiment of the invention in sectional elevation and plan;

Figure 5:
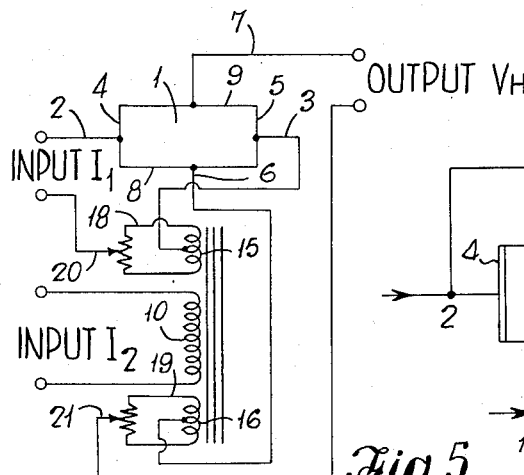
FIG. 5 shows the electrical circuit of a device having compensating coils.
Figure 8:
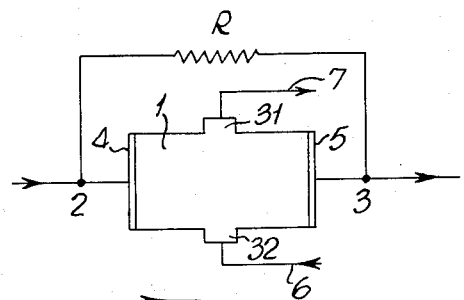
FIG. 8 shows an arrangement of a Hall plate embodying one aspect of the invention.
Figure 6A:
FIGS. 6a and 6b show in section and plan the method of providing potentiometer slides in the arrangement of FIG. 5.
Figure 6B:
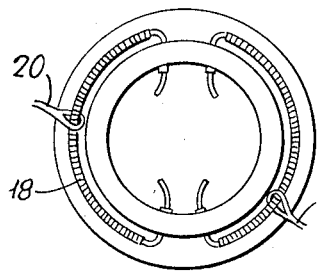
Figure 7:
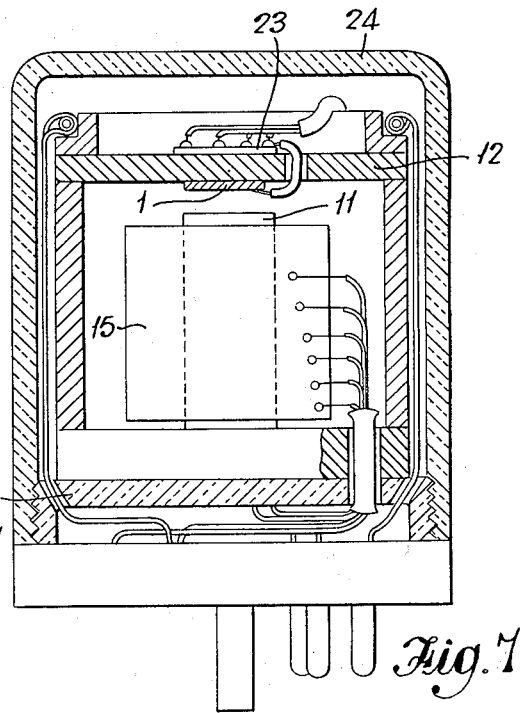
FIG. 7 shows a complete device utilising the circuit of FIG. 5.
Figure 9:
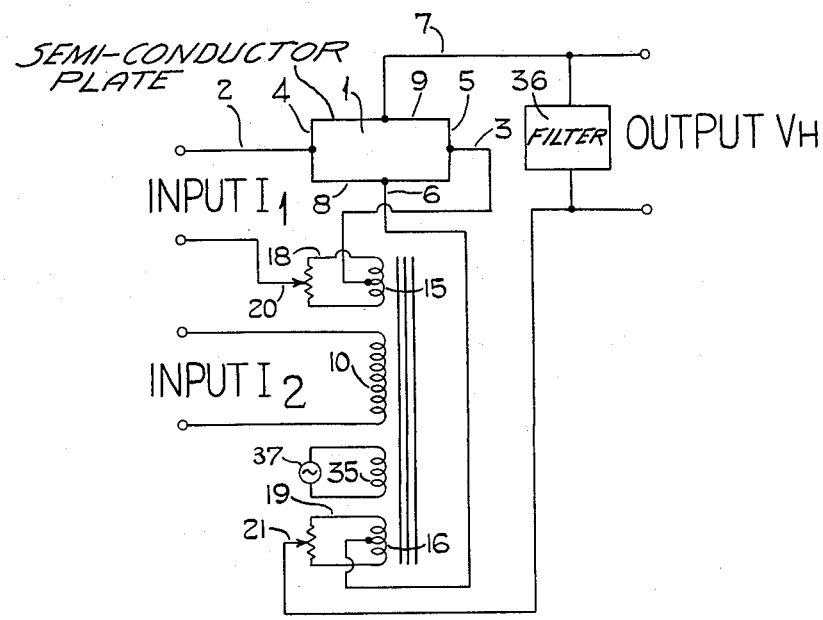
FIG. 9 shows an electrical circuit similar to FIG. 5 and having means for providing an improved linearity.

Referring now to FIG. 1 there is shown therein a semi-conductor plate 1 to which electrical connections 2 and 3 are made to respective opposite ends 4 and 5 of the plate and further connections 6 and 7 are made to the remaining ends 8 and 9. If a current $I_1$ is passed between connections 2 and 3 and a magnetic field, derived for instance from a coil 10 through which a current $I_2$ is passed, is provided between the faces of plate 1 perpendicular to the plane of the paper, then a voltage, known as the Hall voltage, will appear between connections 6 and 7. This voltage is proportional to the product of $I_1$ and the magnetic field. If the magnetic medium is such that the flux produced by coil 10 is proportional to current $I_2$, then the Hall voltage will be proportional to the product of $I_1$ and $I_2$.

One embodiment of an electrical multiplier utilising the above effect is shown in FIGS. 2a and 2b. In these figures there is provided a cylindrical ferrite core 11 having two end plates 12 and 13 at either end of the core. An annular ferrite ring 14 is provided which extends between end plates 12 and 13 and so completes the magnetic circuit through the central core. A field coil 15 is provided in the annular space between core 11 and ring 14 and a thin semi-conductor plate 1 is cemented to top end plate 12 centrally thereof. In construction ring 14 is arranged to project beyond the core so that plate 1 fits into the gap provided between the top plate and the core. The surface of top plate 12 can be formed by a grinding process and the same process can then be used to reduce the thickness of the crystal to a dimension of say 0.002" after which the current and voltage leads are soldered on.

An alternative embodiment of the invention is shown in FIG. 3 in which like parts have like reference numerals. In this case, however, central core 11 is divided into two sections and the semiconductor plate 1 is cemented between them.

Yet another embodiment is shown in FIGS. 4a and 4b in which instead of a single Hall plate a plurality of semiconductor plates 17 are provided round the periphery of top plate 12, and are situated between it and ring 14, plate 12 resting on the centre limb 11. They may be coupled in any desired series or parallel arrangement or independently.

said plate contact said faces of said member and said magnetic flux passes across said plate, a pair of input current connections and a pair of output connections to said plate, the arrangement being such that the voltage between said output connections is proportional to the product of the current in said coil and current flowing between said input connections, and a compensating coil positioned in juxtaposition to said ferrite member and connected in series with said input current connections to said plate so as to compensate for voltages induced in said input current connections by said magnetic flux.

2. A device for multiplying electrical quantities comprising a ferrite member having faces defining a gap, a coil positioned in juxtaposition to said ferrite member so that current in said coil produces a corresponding magnetic flux in said member, a semi-conductor plate positioned in the gap between said faces in said member so that opposite faces of said plate contact said faces of said member and said magnetic flux passes across said plate, a pair of input current connections and a pair of output connections to said plate, the arrangement being such that the voltage between said output connections is proportional to the product of the current in said coil and current flowing between said input connections, and a compensating coil positioned in juxtaposition to said ferrite member and connected in series with said output connections to said plate so as to compensate for voltages induced in said output connections by said magnetic flux.

3. A device for multiplying electrical quantities comprising a ferrite member having faces defining a gap therebetween, a coil positioned in juxtaposition to said ferrite member so that current in said coil produces a corresponding magnetic flux in said member, a semi-conductor plate positioned in the gap between said faces in said member so that opposite faces of said plate contact said faces of said member and said magnetic flux passes across said plate, a pair of input current connections and a pair of output connections to said plate, the arrangement being such that the voltage between said output connections is proportional to the product of the current in said coil and current flowing between said input connections, a centre-tapped compensating coil positioned in juxtaposition to said ferrite member, a potentiometer connected across said compensating coil, a slider on said potentiometer and the centre tap of said coil being connected in series with said input current connections to said plate so that by adjustment of said slider the voltage induced in said compensating coil can compensate for voltages induced in said input connections, a further centre-tapped compensating coil positioned in juxtaposition to said ferrite member, a potentiometer connected across said further compensating coil, a slider on said latter potentiometer and the centre tap of said further compensating coil being connected in series with said output connections to said plate so that by adjustment of said latter slider the voltage induced in said further compensating coil can compensate for voltages induced in said output connections.

4. A device for multiplying electrical quantities comprising a ferrite member, a coil positioned in juxtaposition to the ferrite member so that current in the coil produces a corresponding magnetic flux in the member, a semi-conductor plate positioned between faces in said member defining a gap so that the opposite faces of the plate contact the faces of the member and said magnetic flux passes across said plate, which plate has a pair of current input connections secured to opposite faces thereof, a pair of lugs integral with the plate and positioned along the remaining two faces so that they lie on the same equipotential and isothermal line, a pair of output connections secured to said lugs, the arrangement being such that the voltage between said output connections is proportional to the product of the current in the coil and current flowing between said input connections.

5. A device for multiplying electrical quantities comprising a ferrite member, a coil positioned in juxtaposition to the ferrite member so that current in the coil produces a corresponding magnetic flux in the member, a further coil positioned in juxtaposition to said ferrite member, an A.C. supply connected across said further coil, a semiconductor plate positioned between faces in said member defining a gap so that the opposite faces of the plate contact the faces of the member and said magnetic flux passes across said plate, which plate has a pair of current input connections and a pair of output connections, filtering means in said output connections for filtering components having the frequency of said A.C. supply, the arrangement being such that the filtered voltage between said output connections is proportional to the product of the current in the coil and current flowing between said input connections.

References Cited in the file of this patent

UNITED STATES PATENTS

| | | |
|---|---|---|
| 1,059,120 | Cotton | Apr. 15, 1913 |
| 1,803,868 | Porter | May 5, 1931 |
| 2,550,492 | Millar | Apr. 24, 1951 |
| 2,728,054 | Albers-Schoenberg | Dec. 20, 1955 |
| 2,786,983 | Hill | Mar. 26, 1957 |
| 2,906,945 | Weiss | Sept. 29, 1959 |
| 2,988,707 | Kuhrt et al. | June 13, 1961 |
| 3,008,083 | Kuhrt et al. | Nov. 7, 1961 |
| 3,017,110 | Corder | Jan. 16, 1962 |

FOREIGN PATENTS

| | | |
|---|---|---|
| 567,963 | Great Britain | Mar. 9, 1945 |
| 85,940 | Netherlands | Aug. 15, 1957 |

OTHER REFERENCES

Advertisement by General Ceramics, Keasbey, New Jersey, for Ferramic Core Materials, Electronic Buyers' Guide, June 1957, page 28, copy in Scientific Library Advertisement by Ferroxcube Corp. of America, Saugerties, New York, for ferrite pot cores and bobbins, Electronic Design, Sept. 17, 1958, page 110, copy in Sci. Lib.

July 9, 1963 — W. SAHLER — 3,097,297

HEAT SENSITIVE REPRODUCTION MATERIAL

Filed July 8, 1959

HEAT SENSITIVE COATING AROMATIC AMINES INCLUDING DOUBLE COMPOUNDS WITH METAL HALIDES AND NITROSO-AMINES IN A RESIN BINDER

FIG. 1

TRANSPARENT BASE SHEET

FIG. 2

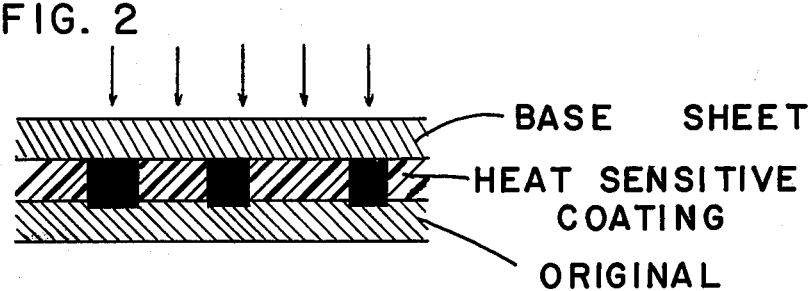

BASE SHEET
HEAT SENSITIVE COATING
ORIGINAL

FIG. 3

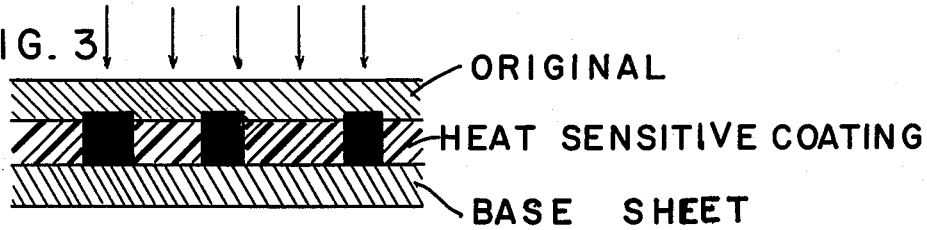

ORIGINAL
HEAT SENSITIVE COATING
BASE SHEET

FIG. 4

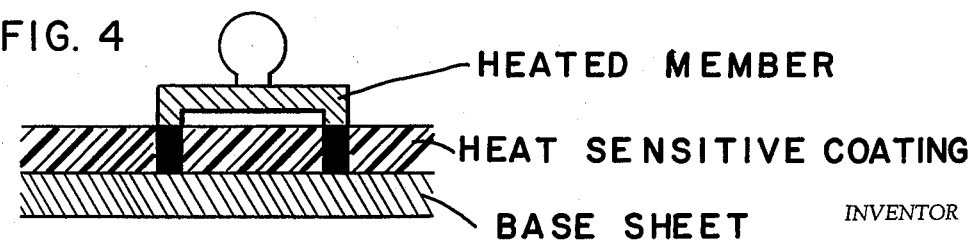

HEATED MEMBER
HEAT SENSITIVE COATING
BASE SHEET

INVENTOR
WILHELM SAHLER
BY
ATTORNEY